March 14, 1933.   W. S. RANDEL ET AL   1,901,051
HIGH STRENGTH CALCINED GYPSUM AND PROCESS OF MANUFACTURING SAME
Filed Aug. 8, 1929   4 Sheets-Sheet 1
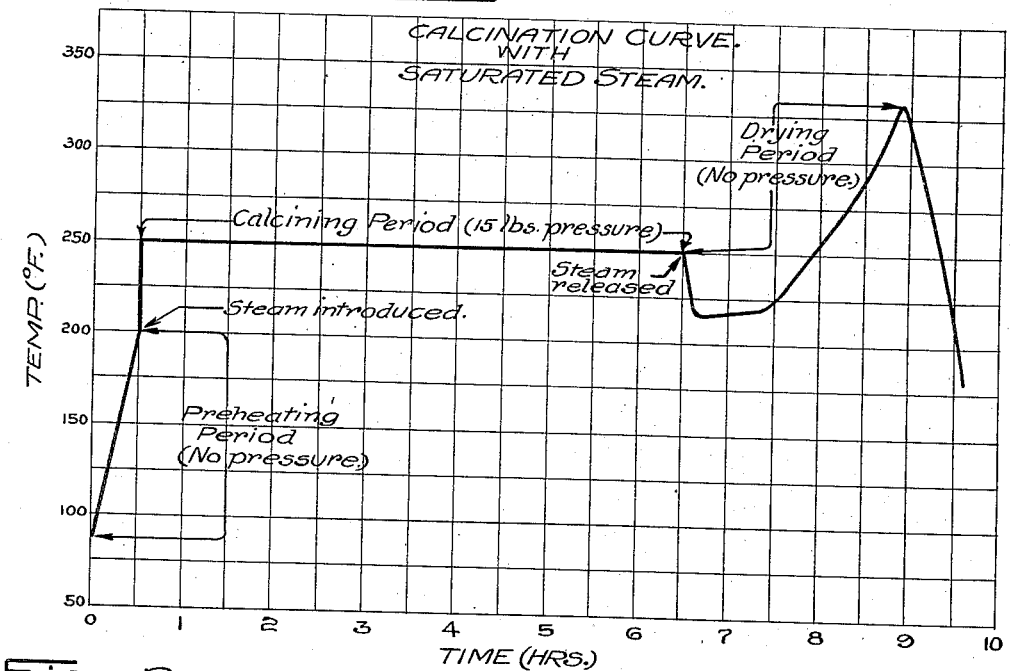
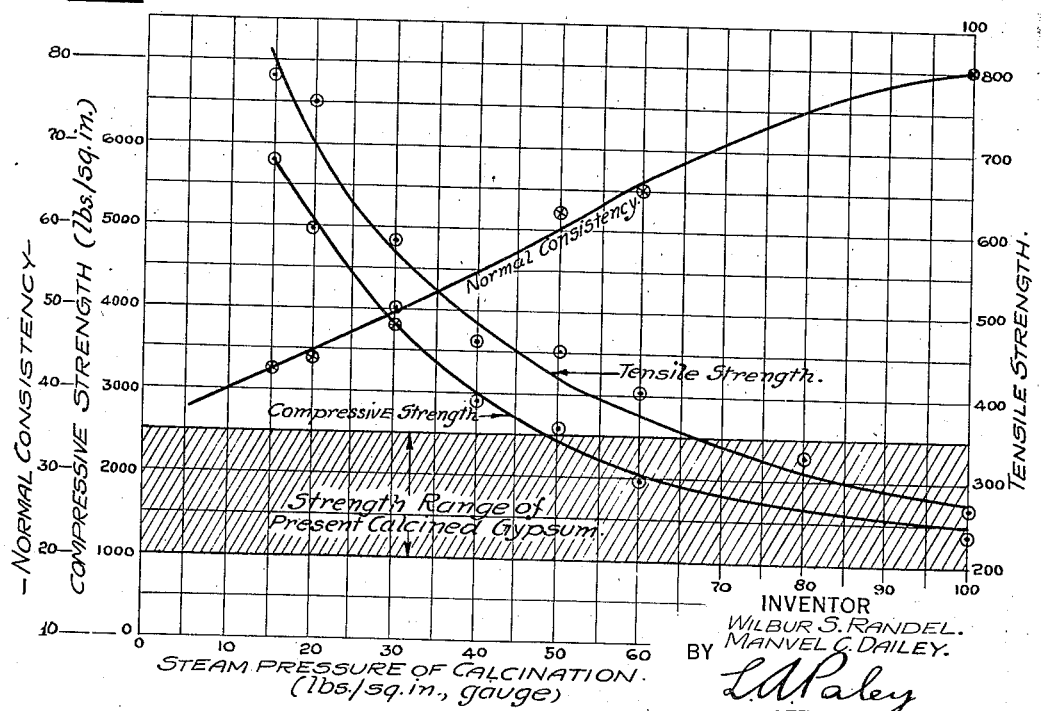
INVENTOR
WILBUR S. RANDEL.
MANVEL C. DAILEY.
BY
ATTORNEY Patented Mar. 14, 1933

1,901,051

UNITED STATES PATENT OFFICE

WILBUR S. RANDEL AND MANVEL C. DAILEY, OF CHICAGO, ILLINOIS, ASSIGNORS TO UNITED STATES GYPSUM COMPANY, OF CHICAGO, ILLINOIS, A CORPORATION OF ILLINOIS

HIGH STRENGTH CALCINED GYPSUM AND PROCESS OF MANUFACTURING SAME

Application filed August 8, 1929. Serial No. 384,343.

This invention relates to a form of calcined gypsum which, when rehydrated, will produce a gypsum cast of unusually high strength. It further relates to a process of manufacturing said calcined gypsum.

In the gypsum industry, gypsum rock is ground up to form a powder, this powder is introduced into large kettles and the kettles are heated externally and also by means of internal fire tubes passing through same. The powder is agitated while being heated and the heating causes steam to be produced as a result of partial dehydration of the gypsum and the steam evolved from the heating of the powder passes up through the mass of powder, causing same to have the appearance of boiling. The results obtained by ordinary kettle calcination are not uniform and the product is apt to vary in strength and composition. Ordinary first kettle calcined gypsum is composed of a mixture chiefly of calcium sulphate hemihydrate and soluble anhydrite with hemihydrate predominating. It is practically impossible to produce pure hemihydrate by the kettle process of calcination. Furthermore, the strength of the resulting product is comparatively low and does not place it in a field of use comparable to that of Portland cement and certain other cementitious materials. We have found that by carefully controlling the manufacturing conditions during the calcination of the gypsum, calcined gypsum having extremely high tensile and compressive strengths is obtained, which consists almost entirely of crystalline calcium sulphate hemihydrate.

An object of this invention, therefore, is to so regulate the calcination of gypsum that calcined gypsum, commonly called stucco, of high tensile and compressive strengths is produced; also to improve calcined gypsum and its process of manufacture in other respects hereinafter specified and claimed.

Reference is to be had to the accompanying drawings forming a part of our specification, in which Fig. 1 is a graph showing the manner of carrying out our improved process, Fig. 2 is a graph showing curves of tensile and compressive strengths of calcined gypsum when made under various manufacturing conditions, Fig. 3 is a graph showing the rate of settling of calcined gypsum powders of the prior art, as well as the powder made from the product of the present invention, at the same sieve-analysis; the said graph also showing the difference between the final volume of the two powders when suspended in a liquid with which they do not react.

Figure 9:
Figure 8:
Figure 7:
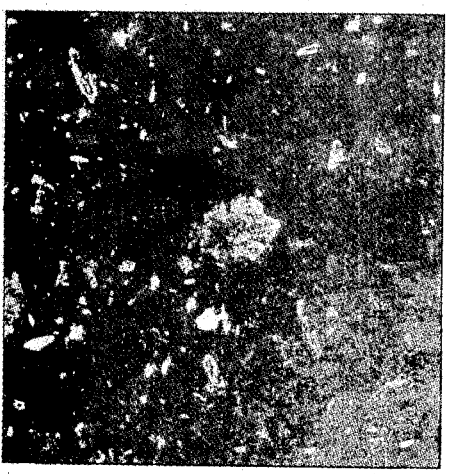

Figs. 7, 8, and 9 are three views of an identical mounting of commercial calcined gypsum as made by the prior art process, the differences between these three figures being caused by variation in illumination, as will be more specifically described hereinbelow.

In the manufacture of ordinary calcined gypsum, the ground gypsum rock is placed in large open kettles each holding approximately 15 tons of the material, and heat is applied to the kettle, this heat being at a very high temperature and applied in large quantities so that the entire water of crystallization intended to be driven off from the gypsum, is taken off in the form of steam at atmospheric pressure in a period of approximately 80 minutes in average mill practice. In considering the results of suddenly applying heat in large quantities to a crystal of gypsum in this standard process of manufacture, it is seen that the water of crystallization is evenly distributed throughout the crystal. The sudden application of a large quantity of heat breaks down the water of crystallization from the crystal and vaporizes this water to form steam. As this steam suddenly liberated at atmospheric pressure occupies a very large volume, the individual gypsum crystals are literally exploded into very minute crystals of calcium sulphate hemihydrate. The extreme fineness of individual ordinary hemihydrate crystals is well known to all petrographic microscopists. Until quite recently, crystal properties of calcium sulphate hemihydrate had not been determined, several authorities maintaining that the material was not crystalline, but was amorphous. This erroneous conclusion was reached only because of the extreme fineness of the crystals being studied. With the aid of a high power, oil immersion lens microscope, ordinary hemihydrate shows very definite crystalline properties.

We have discovered that by applying heat to gypsum rock under carefully controlled conditions of pressure, time and temperature of the heating medium, calcined gypsum may be produced which, when set with water, will give casts having abnormally high tensile and compressive strengths, equal or superior to Portland cement and other cementitious materials of a similar nature. We are thus able to use our high strength calcined gypsum for many purposes for which calcined gypsum has been previously unsuited. While the heat may be supplied by exterior heating of the container for the gypsum, we prefer to use steam for accomplishing the calcination, said steam being applied internally in the container in direct contact with the gypsum.

Figure 5:
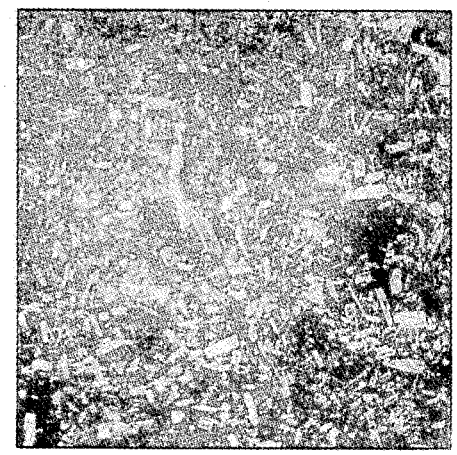
Fig. 5 is a photomicrograph of the crystalline powder resulting from the grinding of the lump shown in Fig. 4; the magnification in this case being 72—X, the photograph having been taken through a set of crossed Nicols.

According to some authorities, the transition temperature of gypsum to hemihydrate, that is, the temperature at which gypsum decomposes to form hemihydrate and water, is about 209° F. However, the speed of reaction at this low temperature is so slow that a process carried on at this temperature is impractical. In actual mill practice, we find that the gypsum crystals become superheated to a certain extent so that they do not start to lose their combined water of crystallization to form hemihydrate until the temperature of the gypsum reaches about 225–250° F. If this water of crystallization is separated as a liquid from the gypsum molecule without explosively converting the water into steam, the gypsum crystals are not shattered into minute crystals of hemihydrate but the resulting product is in the form of rather large, definite, well-formed crystals as shown in Fig. 5 of the accompanying drawings—these crystals being probably recrystallized in the liquid water separated from the original gypsum crystals. To produce the transition temperature of 225° F., saturated steam of 19 pounds per square inch absolute or 5.3 pounds per square inch gauge is required. However, when the saturated steam in contact with the gypsum powder is maintained at 5.3 pounds gauge, the time required for dehydration is abnormally long, and it is therefore necessary to increase the pressure of the steam to about 15 pounds gauge in order to decrease the time required for calcination within practical bounds, i. e., to about 6 or 7 hours. In actual practice, a steam pressure of 17 pounds gauge will be found practical.

To illustrate the working of our process, the following data based on a run are given:—

Gypsum rock is crushed so that the pieces range from $\frac{1}{2}''$ in diameter to $2''$ in diameter. Landplaster or finely ground gypsum may be used for calcination, the calcined gypsum having when set, a compressive strength of about 4000 lbs. per sq. in. and a tensile strength of 600 lbs. per sq. in. However lumps of coarsely crushed gypsum are preferred for calcination because of the ease of filling and dumping the calciner, and the ease of drying and grinding the calcined gypsum. The fines occurring in the crushed gypsum may be screened from the coarser lumps and then briquetted for calcination if desired. If desired by-product calcium sulphate, such as that obtained from the phosphate fertilizer industry, used molds, or other forms of gypsum may be used as a raw material. This gypsum rock is preferably but not necessarily placed in a cylinder extending vertically, the material resting on a false, perforated, sheet-iron bottom in the calciner. This rock placed in the calciner is preferably pre-heated to a temperature of 120° F. to 150° F. before calcination. After loading the calciner, a saturated steam is introduced into the inside of the calciner at a pressure of about 17 pounds per square inch gauge and a temperature of 253° F., and this pressure is maintained throughout a calcining period of 5 to 7 hours, condensed water being removed from the calciner below the perforated plate from time to time during the calcination. At the end of the calcination, the pressure is released, and the material then consists of calcium sulphate hemihydrate containing 10 to 15% uncombined or free water which must be removed. The drying may be accomplished by external heating under atmospheric pressure in any suitable way, such as by a rotary dryer of standard design. However the temperature of the damp, calcined material must be maintained in excess of 212° F. until the material is dried. The dried material is then ground in any suitable series of grinding machine so that 85%, or even more of the material passes a 100 mesh screen. The graphical representation of the approximate heating cycles used in our process are shown in Fig. 1 of the drawings.

Upon rehydrating the resulting calcined gypsum with the proper amount of water, casts having high tensile and compressive strengths and low water absorption are produced. By proper amount of water is meant water sufficient to bring the mix to normal or pouring consistency. Normal consistency is defined as that amount of water in cubic centimeters or grams, which, when mixed with 100 grams of dry stucco will produce a mix of such consistency that it will just pour from a cup. This consistency figure is the same as percentage water based on weight of calcined gypsum.

The strength of set casts prepared from calcined gypsum increases as the amount of water mixed with the calcined gypsum is decreased. All ordinary gypsum calcined according to present methods requires the addition of more than 50 percent water to bring the resultant mix to pouring consistency. The crystalline calcined gypsum calcined according to the process herein described, possesses the property of requiring less than 50 percent water to bring the mix to pouring consistency. This property of low normal consistency, therefore, explains in part the high strength of casts prepared from this material. It should not be understood, however, that this property of low consistency is the only cause of high strength of our product.

By mixing with more water than is required to bring to normal pouring consistency, we have prepared casts from our crystalline calcium sulphate hemihydrate which still possess 25–100 percent greater strength than casts made from ordinary calcined gypsum and mixed with the same amount of water. By mixing our crystalline calcium sulphate hemihydrate with less water than is required to bring the mix to pouring consistency we can obtain strengths greatly in excess of those herein reported. Compressive strengths of 7500 lbs. per sq. in. with corresponding tensile strengths of 1000 lbs. per sq. in. have been obtained on mixes cast with 35 percent water. All strengths shown in the curves of Fig. 2 of the drawings were determined on casts made from calcined gypsum at pouring consistency.

As the pressure of calcination is increased, the crystalline character of the resulting calcined gypsum changes. At low pressure (15 lbs. per sq. in. gauge) the crystals are rather short, thick and well formed. At 50 lbs. per sq. in. gauge pressure the crystals have become somewhat more fibrous in character, while at 100 lbs. practically all the material is in the form of long, very thin, needle like crystals. As the crystals become more fibrous and needle like with increasing pressure the amount of water required to bring the mix to pouring consistency becomes greater and the strength of the resulting set casts decreases. This phenomena is due to the spongy, mat like mass resulting from the fibrous crystals. A mat of this type requires more water to bring it to a plastic state than does a mass of stubby, short, non-interlocking crystals such as are obtained under low pressure calcination.

Ordinary calcined gypsum calcined under atmospheric pressure is composed of agglomerates of very tiny, minute crystals of hemihydrate as hereinbefore described. Seen under crossed Nicol prisms in a petrographic microscope, the difference in crystal structure between ordinary calcined gypsum and pressure calcined gypsum is strikingly demonstrated by the difference in color between the two materials. Due to their comparatively large size, pressure calcined calcium sulphate crystals are seen to be brilliantly colored, while little or no color is present in the case of the tiny crystals of ordinary calcined gypsum. The agglomerates of fine, ordinary calcined gypsum crystals are porous, requiring a comparatively large amount of water to bring a mass of calcined gypsum composed of these agglomerates to pouring consistency.

It is seen from the curves shown in Fig. 2, that calcined gypsum produced by steam having a pressure of 15 pounds to 50 pounds gauge and a temperature of 225–300° F., is higher in strength than the maximum strength obtained from ordinary calcined gypsum, and our process contemplates the use of saturated steam in this pressure range. It will be seen from the curves in Fig. 2, that calcined gypsum produced by our improved process with saturated steam at 20 pounds per square inch gauge has a compressive strength of approximately 5000 pounds per square inch, which is double that of the highest compressive strength produced by the standard method now in use. The compressive strength of standard concrete with a 1:1:2 mix of Portland cement, sand and aggregate respectively is about 3300 pounds per sq. in., so that our calcined gypsum is superior even to ordinary concrete, as to compressive strength.

Our high strength product is distinguished from Keene's cement in that it has a natural quick setting time of 15 to 30 minutes, while Keene's cement is made by an entirely different process, has no water of crystallization and has a setting time of about 2 to 24 hours depending on the quantity of accelerator used.

Our high strength product has about the same setting time as ordinary first settle calcined gypsum but is distinguished from it in that our producet is practically pure crystalline calcium sulphate hemihydrate. The casts produced upon setting and drying have a very low water absorption which opens up a new field of usefulness for load bearing building blocks and molding plaster. Ordinary kettle calcined plaster of Paris at 75 cc. pouring consistency, will produce dried casts having a water absorption of 35–40%. Molding plaster made by the addition of calcium chloride in the kettle has a consistency of 63 cc. and a water absorption of the set and dried casts of 28%. Our improved high strength material has the following absorption at the indicated consistencies:

| Consistency | Absorption |
|---|---|
| 45 cc. | 18.0% |
| 40 cc. | 16.0% |
| 35 cc. | 13.5% |
| 30 cc. | 11.5% |
| 25 cc. (molded by vibration) | 9.0% |

When molded by a press at 35 cc. consistency and 5 pounds per square inch pressure, the excess water is squeezed out through the joints of the mold, and the resulting set and dried cast has a water absorption of only 5.5%. When molded at 4000 lbs. per square inch pressure the casts have an absorption of only 3.2%. These products thus have a lower absorption than clay tile which run about 16% absorption.

The present invention, in its simplest terms and as related to the product, may be described as forming a new type of calcium sulphate hemihydrate, capable of rehydration and setting by admixture with water in a manner quite similar to that of ordinary calcined gypsum. The new product is distinguished, however, from the calcined gypsum products heretofore produced by being substantially entirely monomineralic and consisting solely of crystal fragments consisting of pure calcium sulphate hemihydrate of the characteristics shown in the drawings, which crystals by reason of their close packing require a great deal less water to convert them into a cementitious slurry of normal pouring consistency. That is to say, equal weights of the new product and of the prior art calcined gypsum will require different amounts of water to yield a slurry of the same pouring consistency, the advantage being with the new product in that it requires less than one-half its weight of water to produce a freely pouring and fluid slurry, the average consistency of the new product being about from 39 to 42 milliliters of water per 100 grams of the new product; while the prior art calcined gypsum requires from 60 to 90 milliliters of water per 100 grams. Partly as the result of this low consistency, but also by reason of the crystalline nature of the product, the gypsum casts produced by gauging the new product with water and allowing the mixture to set is very much denser and also very much harder and stronger than any calcined gypsum as hitherto produced at any temperature below 450° F.

Referring now to Fig. 7, this figure is a photomicrograph of commercial calcined gypsum powder suspended in an immersion oil having an index of refraction of 1.56; the illumination being from below, and the particles being examined between crossed Nicols. The nature of the product can readily be seen. The dark shading of the larger fragments (the magnification is 72—X) is not due to red interference color but is due to the "white opacity" such as is commonly encountered in enamels. This may be caused by the heterogeneous orientation of the small fibers of the hemihydrate or by the non-uniformity of the product in a chemical sense. Such a system will not transmit light, but, rather, will disperse it, and the dark color to be seen in this figure is due to this "white opacity".

Fig. 8 is a photomicrograph of the identical section shown in Fig. 7, but taken with ordinary instead of polarized light; the light being transmitted from below the stage of the microscope. In this photomicrograph the particles now appear dark for the same reason that they appear shaded in Fig. 7. In several of the more elongated particles, even at the magnification of 72—X, the fibrous character of the aggregate can be seen, as well as the zonal banding caused by the non-uniformity of the calcination.

Further evidence of this white opacity, and, therefore, of the heterogeneity, can be seen in Fig. 9, in which the illumination is from above at a fairly large angle from the vertical onto the specimen immersed in an oil having a refractive index of 1.56. Under such illumination these particles show as opaque bodies which reflect light in a diffuse form. If these particles had not been heterogeneous, there would have been an optically homogeneous system and the field of the microscope would have been uniformly illuminated or entirely dark, depending upon the inclination of the incident illuminating rays.

It will thus be seen that the calcined gypsum of the prior art consists of a heterogeneous mixture of fibrous masses of calcium sulphate hemihydrate possibly also containing nuclei of substantially unchanged gypsum and incrusting particles of calcium sulphate anhydrite. Such masses, as is clearly visible on the said Figs. 7, 8, and 9, are extremely porous, and, therefore, a powder made from such masses possesses a large surface area and requires a large amount of water to bring it to pouring consistency. This is caused partially by the capillary effect of the interstitial nature of the product as well as to the fibrous structure of the particles which prevents close packing and therefore produces a high porosity and low strength in the final set product.

Figure 3:
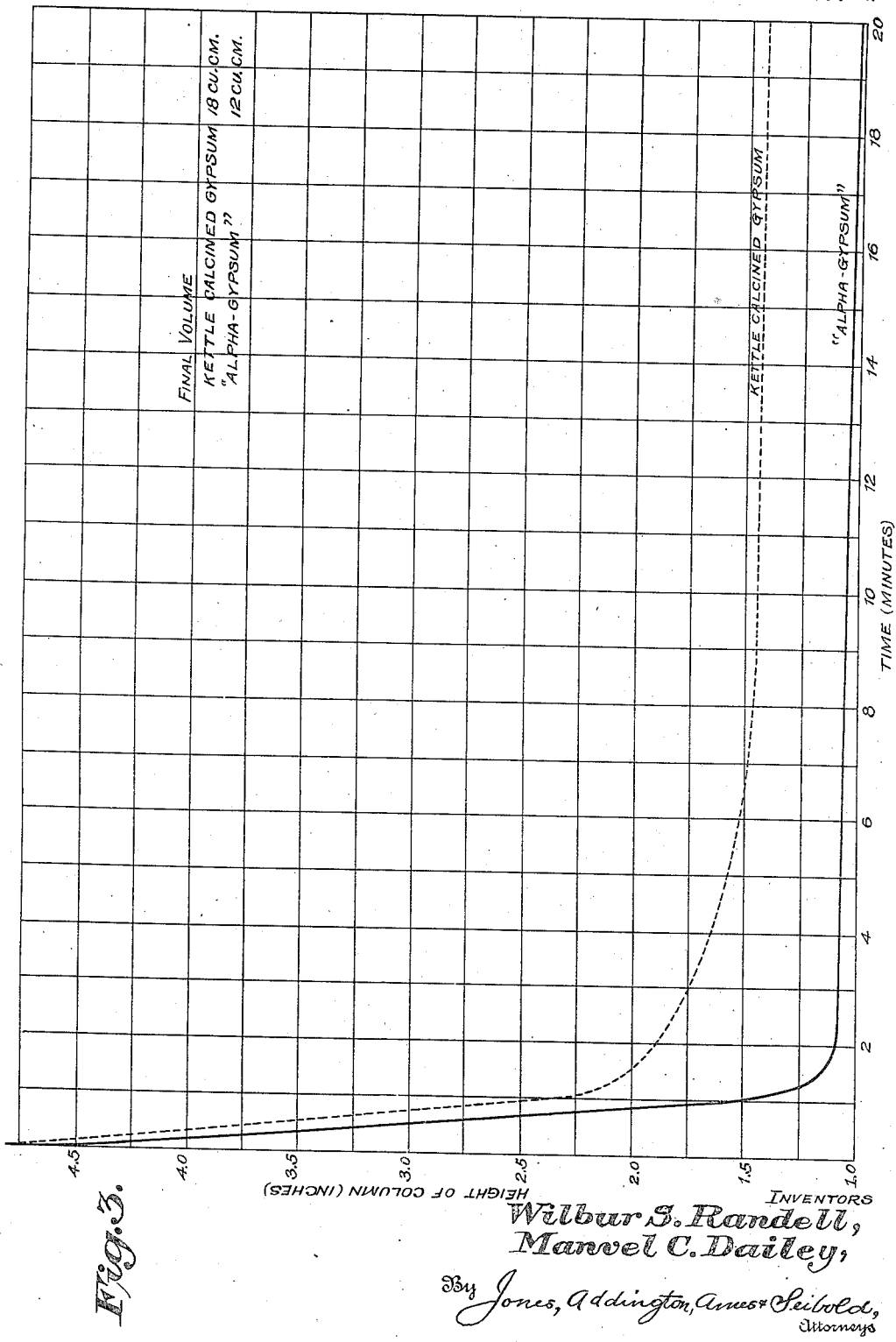

That the difference between the product made by the process above described and the prior art process may be still more clearly brought out, reference is directed to Fig. 3 which shows the rate of settling and final volume of equal weights of powdered prior art calcined gypsum and the new product, at the same degree of fineness of grinding. The data shown on Fig. 3 were obtained by mixing 10 grams of the new product ground so that it would pass entirely through a 120 mesh screen, but entirely retained on a 200 mesh screen, with 50 milliliters of acetone and, thoroughly shaking the sample, and then allowing it to stand and marking the rate of settling in terms of the height in inches of the column; this being done in a large test tube. A similar experiment was made with the prior art calcined gypsum also ground so as to pass entirely through a 120 mesh sieve but entirely retained on a 200 mesh sieve, also using 10 grams in 50 milliliters of acetone; the shaking and other operations being identical in both cases and the test tubes of the same size. It will be seen from the graph shown in Fig. 3 that the original volume was at a level above 4½ inches but in the case of the new product rapidly became reduced so that at the end of the first minute the height of the column was 1.5 inches and at the end of the second minute was but slightly less than 1⅛ of an inch, this changing very slightly during the second period; the depth after 20 minutes being just slightly more than 1 inch. Under identical conditions the prior art product at the end of one minute had a column height of a little more than 2½ inches, which at the end of two minutes was about 1¾ inches, at the end of four minutes about 1⅝ inches, finally sinking at the end of 10 minutes to just below 1½ inches, at which height it maintained itself indefinitely. After allowing to settle for one hour, ten grams of the products, suspended in 50 milliliters of acetone, compared as follows: New product 12 cubic centimeters, prior art product 18 cubic centimeters. This conclusively shows that there is a very great difference between the prior art product and that made in accordance with the present invention, the difference being not one in size or degree but a distinct difference in type, the new product being crystalline and possessed of the property of rapidly sinking in a liquid with which it does not combine.

Figure 4:
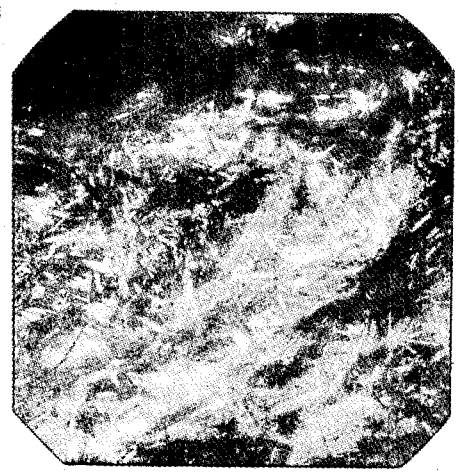
Fig. 4 is a photomicrograph of the surface of a lump of calcined gypsum, or, properly, lump of calcium sulphate hemihydrate as made by the present invention, at a magnification of 33—X.

As a further characterization of the inherent properties of the new product produced in accordance with the present invention, and which is a product not occurring in nature but being entirely a manufactured product made by the process disclosed hereinabove, some of its outstanding petrographic properties will now be recited. The lumps of original gypsum are very dense and hard and show no interstitial porosity. By reason of the fact that in making the new product the gypsum is calcined in lumps, or else under conditions where there is practically no agitation of the gypsum particles, the lumps of calcined gypsum produced will be substantially monomineralic. That is to say, the lumps will consist of a mass or aggregate of individual transparent non-porous crystals of calcium sulphate hemihydrate which merely cohere because of their heterogeneous orientation. These lumps are hence readily crushed and reduced to a crystalline powder. As is well known, a powder derived from a crystalline substance will consist of particles which are entirely similar geometrically with the larger crystals from which they are derived; this being due to the fact that crystals will fracture along their natural cleavage planes. By reason of the slow steam-pressure calcination, all of the original gypsum is converted into crystalline form, the crystals being short columns or rods approximately two or three times as long as they are thick. The appearance of the surface of such a lump is best seen by an inspection of Fig. 4 wherein the black areas are the interstices between the crystals, the crystals themselves appearing white in Fig. 4. When examining Fig. 5, which is at a magnification of 72—X, the individual crystals appear to have a zonal banding which, however, is due to the inability of the ordinary photographic plate to produce the interference colors visible when this product is examined through crossed Nicols. The black bands in the individual crystals are really the colors near the red end of the spectrum, which, of course, photograph as black. The striking homogeneity of the new product is clearly seen from this figure.

Figure 6:
Fig. 6 is a photomicrograph of an extremely thin section, approximately 0.02 millimeters in thickness, of the lump shown in Fig. 4, also between crossed Nicols.

Fig. 6, which is a photomicrograph of an extremely thin section of the lump of the new product, shows what appear at first sight to be rather ragged crystals, but this streaky appearance is the result of the great difficulty in preparing a thin section of so open a structured material as these lumps. The trace of cleavage in the individual crystals may be seen in the form of fine lines running along the length thereof. The uniform character of the material is readily appreciated by an inspection of this photomicrograph. The interstices in these lumps are caused by the loss of water which produces a shrinkage in volume so that the individual crystals of calcium sulphate hemihydrate are denser than the original gypsum, although the lumps, of course, will weigh less than the original lumps because they have lost most of their water.

The shrinkage phenomena which produce the porous aggregate of non-porous crystals which constitutes the calcined lumps can be appreciated from a consideration of the specific volume of gypsum and its conversion product, namely, hemihydrate:—

|  | Gypsum | New product |
|---|---|---|
| Specific gravity | 2.320 | 2.550 |
| Specific volume | .431 | .309 |

One hundred grams of pure gypsum in the solid would occupy 43.1 cc. and when calcined to form hemihydrate it loses 15.7 grams of water, the volume of which is 15.7 cc. There is a further shrinkage due to change into hemihydrate, which has a lower specific volume, thus—

43.1 cc. volume of 100 grams of gypsum
15.7 cc. volume of the water lost in calcination
27.4 cc. difference
26.0 cc. volume of 84.3 grams of hemihydrate
1.4 cc. volume change due to change in state.
Total volume change 15.7 cc.+1.4 cc.=17.1 cc. which is equal to 39.7% of the original gypsum volume.

In the case of the new product this volume change is represented in the coarse voids between the separate crystals of the hemihydrate in the calcined lump, and when the lump is subsequently pulverized these intercrystalline pores are eliminated, and the resultant powder consists of individual crystal fragments.

On the other hand, commercial pulverization of the ordinary calcined gypsum does not proceed as far as to disintegrate the fibrous aggregate of the hemihydrate to form separate crystals. As shown previously, the product of calcination as prepared for the market by prior art processes consists predominantly of hemihydrate, forming a fibrous aggregate thereof with fine capillary pores. The presence of these pores in the particles which make up the greatest part of the ground prior art product would account for the much larger amount of tempering water required, due to the fact that some of the water is drawn into the capillary pore space, which water would not therefore wet the outside of the grains to make a plastic mass or to form a slip for pouring. The individual crystals of the new product, being non-porous, do, therefore, not absorb any water, so that all of the water added is useful to produce a low consistency.

There appears to be no question but that the new product, which may for convenience and to differentiate it from the prior art product, be designated as "alpha-gypsum", is entirely different from anything hitherto produced in this art. "Alpha-gypsum" is substantially monomineralic, and when ground consists of cleavage fragments and crystals of pure calcium sulphate hemihydrate in the form of short rods or prisms. It is free from unchanged gypsum and therefore a uniform product of manufacture. It also differs from rotary calcined gypsum pebbles, for these produce fibrous masses quite analogous to those produced by kettle calcination.

The theoretical explanation of these hereinabove-discussed rather involved phenomena is extremely difficult, but the fact remains that when the pressure, temperature and time of the present process are employed that a product results which is characterized by properties inherent in no previously made or described calcined gypsum product, and it is for such product and process for producing the same, that the following claims are made.

We would state in conclusion, that while the details described constitute a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:

1. The step in the process of calcining gypsum to produce a high strength calcined gypsum which comprises heating gypsum in a closed container for a period of 5 to 7 hours with the pressure of the steam in contact with the gypsum maintained substantially uniform at approximately 17 pounds per square inch gauge.

2. The process of preparing powdered and calcined gypsum of high strength which comprises heating gypsum in a closed container with the pressure of the steam in contact with the gypsum maintained at approximately 17 pounds per square inch gauge for a period of 5 to 7 hours, drying said calcined gypsum, and grinding said dried calcined gypsum until more than 85% of same passes through a 100 mesh screen.

3. The step in the process of calcining gypsum to produce a high strength calcined gypsum, which comprises heating said gypsum with a hot aqueous fluid under pressure at a temperature of 225–300° F. for a period of approximately 6 hours.

4. The process of manufacturing high strength calcined gypsum, which comprises heating lumps of gypsum rock having a diameter of ½" to 2", in a closed container by steam under pressure and having a temperature of about 253° F., for a period of 5 to 7 hours, drying said calcined gypsum, and grinding the dried calcined gypsum so that more than 85% of same passes through a 100 mesh screen.

5. A high strength calcined gypsum comprising crystals of calcium sulphate hemihydrate having a compressive strength when said with water at pouring consistency in excess of 3000 pounds per square inch.

6. A high strength quick setting calcined gypsum having a compressive strength when set with water at pouring consistency, of 3000 to 5750 pounds per square inch.

7. A high strength calcined gypsum, comprising crystals of calcium sulphate hemihydrate, which when ground and set with water at pouring consistency, have a compressive strength of 2500 to 5750 pounds per square inch.

8. A high strength calcined gypsum consisting essentially of crystalline calcium sulphate hemihydrate having a compressive strength when set with water at pouring consistency, in excess of 3000 lbs. per square inch, and having a setting time of 15 to 30 minutes.

9. Crystalline calcium sulphate hemihydrate in substantially pure form containing substantially no anhydrite or dihydrate of calcium sulphate, and ground so that it has a pouring consistency of less than 50%.

10. Substantially pure, crystalline, finely ground calcium sulphate hemihydrate requiring the addition of less than 50% water to bring to pouring consistency.

11. Substantially pure, crystalline, calcium sulphate hemihydrate setting in 15 to 30 minutes when mixed with water at pouring consistency, and having a compressive strength in excess of 3000 lbs. per square inch.

12. A high strength, quick setting, calcined gypsum obtained by the steam calcination of gypsum rock in lump form, said calcined gypsum having a compressive strength when set with water at pouring consistency of 3000 to 5750 pounds per square inch.

13. Crystalline calcium sulphate hemihydrate in substantially pure form containing substantially no anhydrite or dihydrate of calicum sulphate, said product being formed by steam calcination at 15 to 20 pounds per square inch gauge and having a pouring consistency of less than 50%.

14. Substantially pure, crystalline, calcium sulphate hemihydrate setting in 15 to 30 minutes, having a cast compressive strength when mixed with water at pouring consistency and dried, in excess of 3000 pounds per square inch, and obtained by steam calcination at 15 to 20 pounds per square inch gauge.

15. The process of preparing high strength calcined gypsum, which comprises heating gypsum in a closed container for a period of 5 to 7 hours with the pressure of steam in contact with the gypsum maintained substantially uniform at 17 to 20 pounds per square inch gauge, drying the resulting crystallized calcined gypsum, and grinding said dried and calcined gypsum to powdered form until more than about 85% of the product passes a 100 mesh screen, whereby the product has a normal consistency of less than 50%.

16. The step in the process of calcining gypsum to produce a high strength, calcined gypsum, which comprises heating lump gypsum in a closed, stationary container for a period of 5 to 7 hours with the pressure of the steam in contact with the gypsum maintained substantially uniform at a pressure of 15 to 20 pounds per square inch gauge.

17. The step in the process of calcining gypsum to produce a high strength, calcined gypsum, which comprises heating by-product gypsum in a closed container for a period of 5 to 7 hours with saturated steam at a pressure of 15 to 20 pounds per square inch gauge.

18. As a new article of manufacture, lumps of calcium sulphate hemihydrate consisting of a monomineralic aggregate of non-porous crystals, said aggregate being readily reduced by mild attrition into individual crystals which are capable of being further broken down by fission along their cleavage planes into particles all of which are crystallographically similar.

19. Calcium sulphate hemihydrate in the form of hexagonal homogeneous crystals of substantially zero porosity readily wetted by but non-absorbent of water, and further characterized by cleavage planes allowing of their ready subdivision into smaller crystal particles entirely similar to the larger crystals from which said particles are derived.

20. As a new article of manufacture, lumps of calcium sulphate hemihydrate consisting of a monomineralic loosely coherent aggregate of non-porous crystals, said aggregate being readily reduced by mild attrition into individual crystals which are capable of being further broken down by fission along the cleavage planes into particles all of which are crystallographically similar.

21. A substance that on gauging with water sets and forms a dense stone-like body, said substance consisting of transparent crystals of calcium sulphate hemihydrate of zero porosity free from nuclei of unchanged gypsum and encrusting porous hemihydrate aggregates.

22. Calcium sulphate hemihydrate in the form of individual crystal fragments that are entirely homogeneous throughout and have no porosity.

23. Calcium sulphate hemihydrate in the form of dense, transparent, entirely non-porous completely homgeneous crystal fragments derived from entirely similar larger crystals of the above description by attrition, each particle being crystallographically identical with all other particles and with the larger crystals from which they are derived.

WILBUR S. RANDEL.
MANVEL C. DAILEY.

CERTIFICATE OF CORRECTION.

Patent No. 1,901,051.  March 14, 1933.

WILBUR S. RANDEL, ET AL.

It is hereby certified that error appears in the printed specification of the above numbered patent requiring correction as follows: Page 1, line 20, for "kettle" read settle; page 2, line 101, strike out the article "a"; page 6, line 119, claim 5, for "said" read set; page 7, line 109, claim 23, for "homgeneous" read homogeneous; and that the said Letters Patent should be read with these corrections therein that the same may conform to the record of the case in the Patent Office.

Signed and sealed this 27th day of August, A. D. 1935.

Leslie Frazer

Acting Commissioner of Patents.

(Seal)